US012209530B1

(12) United States Patent
Harding

(10) Patent No.: US 12,209,530 B1
(45) Date of Patent: Jan. 28, 2025

(54) CHASSIS ASSEMBLY AND FUEL TANK FOR GENERATOR SET AND METHOD OF ASSEMBLING CHASSIS ASSEMBLY

(71) Applicant: Cummins Limited, London (GB)

(72) Inventor: Ashley Laurence Harding, Sandwich (GB)

(73) Assignee: Cummins Limited, London (GB)

( * ) Notice: Subject to any disclaimer, the term of this patent is extended or adjusted under 35 U.S.C. 154(b) by 0 days.

(21) Appl. No.: 18/506,644

(22) Filed: Nov. 10, 2023

(51) Int. Cl.
*F02B 63/04* (2006.01)
*F02B 77/13* (2006.01)
*F02M 37/00* (2006.01)

(52) U.S. Cl.
CPC ............ *F02B 63/044* (2013.01); *F02B 77/13* (2013.01); *F02M 37/0076* (2013.01); *F02B 2063/045* (2013.01)

(58) Field of Classification Search
CPC .. F02B 63/044; F02B 77/13; F02B 2063/045; F02M 37/0076
See application file for complete search history.

(56) References Cited

U.S. PATENT DOCUMENTS

| | | | |
|---|---|---|---|
| 2011/0168468 A1 | 7/2011 | Taguchi et al. | |
| 2021/0031834 A1 | 2/2021 | Takeda | |
| 2022/0227224 A1 | 7/2022 | Spurling et al. | |

FOREIGN PATENT DOCUMENTS

| | | | | |
|---|---|---|---|---|
| CN | 201843714 U | | 5/2011 | |
| CN | 104603514 A | * | 5/2015 | ............ F02B 63/044 |
| CN | 205402110 U | | 7/2016 | |
| CN | 207471025 U | | 6/2018 | |
| WO | WO-2011/055695 A1 | | 5/2011 | |

OTHER PUBLICATIONS

Cummins, QSG12 Q Range: https://www.cummins.com/generators/qsg12-q-range?v=4626, accessed Nov. 9, 2023.
Cummins, QSK23 for Commercial Industrial: https://www.cummins.com/generators/qsk23?v=3006, accessed Nov. 9, 2023.
Cummins, QSX15 for Commercial Industrial: https://www.cummins.com/generators/qsx15?v=3141, accessed Nov. 9, 2023.
Cummins, QSZ13: https://www.cummins.com/generators/qsz13?v=3771, accessed Nov. 9, 2023.
Search Report for GB Application No. GB2317221.6, dated Mar. 22, 2024, 3 pgs.

* cited by examiner

*Primary Examiner* — Jacob M Amick
*Assistant Examiner* — Charles J Brauch
(74) *Attorney, Agent, or Firm* — Foley & Lardner LLP

(57) ABSTRACT

A chassis assembly for a generator set includes a frame. The frame includes a first side rail and a second side rail. The chassis assembly includes a fuel tank disposed between the first side rail and the second side rail. The fuel tank includes a top surface. The chassis assembly includes at least one crossmember disposed at least partially in the fuel tank. The at least one crossmember includes a top plate disposed level with or below the top surface of the fuel tank. The at least one crossmember includes a sidewall that extends from the top plate. The sidewall is disposed in the fuel tank and defines an opening for fluid to flow through.

20 Claims, 7 Drawing Sheets

CHASSIS ASSEMBLY AND FUEL TANK FOR GENERATOR SET AND METHOD OF ASSEMBLING CHASSIS ASSEMBLY

TECHNICAL FIELD

The present disclosure relates to a chassis assembly and a fuel tank for a generator set and a method of assembling a chassis assembly for a generator set.

BACKGROUND

Generator sets (also known as "gensets") may be employed for physical power production in a variety of applications (e.g., standby/backup power applications, etc.). A genset typically includes an engine and an electric power generator coupled to the engine. The engine is structured to drive the generator which, in turn, can produce electricity. The engine and the generator can be disposed on a structural support system or chassis assembly that provides support for the generator set.

SUMMARY

One embodiment of the present disclosure is directed to a chassis assembly for a generator set. The chassis assembly includes a frame. The frame includes a first side rail and a second side rail. The chassis assembly includes a fuel tank disposed between the first side rail and the second side rail. The fuel tank includes a top surface. The chassis assembly includes at least one crossmember disposed at least partially in the fuel tank. The at least one crossmember includes a top plate disposed level with or below the top surface of the fuel tank. The at least one crossmember includes a sidewall that extends from the top plate. The sidewall is disposed in the fuel tank and defines an opening for fluid to flow through.

One embodiment of the present disclosure is directed to the chassis assembly, wherein the first side rail is positioned away from the second side rail, and the at least one cross-member extends between the first side rail and the second side rail, and couples with the first side rail and the second side rail.

One embodiment of the present disclosure is directed to the chassis assembly, wherein the sidewall comprises a top edge and a bottom edge. The top edge is coupled with or integral with the top plate and the bottom edge is spaced apart from the top plate. The opening is positioned closer to the top edge than the bottom edge.

One embodiment of the present disclosure is directed to the chassis assembly, wherein the at least one crossmember defines a channel within the fuel tank, and the opening being a vent for air to escape from the channel.

One embodiment of the present disclosure is directed to the chassis assembly, wherein the at least one crossmember comprises a plurality of openings. The plurality of openings are disposed along a length of the at least one crossmember and adjacent to the top plate of the at least one crossmember.

One embodiment of the present disclosure is directed to the chassis assembly, wherein the at least one crossmember comprises a pocket that extends from the top plate of the crossmember into the channel. The pocket is configured to receive a projection of an external component. The pocket is configured to reduce leakage of fuel from the fuel tank.

One embodiment of the present disclosure is directed to the chassis assembly further comprising an antivibration mount. The antivibration mount includes the projection to be disposed in the pocket of the at least one crossmember.

One embodiment of the present disclosure is directed to the chassis assembly in which the at least one crossmember comprises a plurality of crossmembers disposed at least partially in the fuel tank. The plurality of crossmembers include a first crossmember and a second crossmember. The first crossmember is configured to support an engine and the second crossmember is configured to support an alternator.

One embodiment of the present disclosure is directed to the chassis assembly wherein the plurality of crossmembers comprise a plurality of top plates, and wherein the top surface comprises a plurality of panels. The plurality of panels are sealably coupled with the plurality of top plates to reduce leakage of fuel from the fuel tank via the top surface.

One embodiment of the present disclosure is directed to the chassis assembly in which the at least one crossmember comprises a plurality of crossmembers. The plurality of crossmembers include a first crossmember and a second crossmember. The first crossmember is disposed at least partially in the fuel tank and the second crossmember is disposed external to the fuel tank. The top plate of the first crossmember is a portion of the top surface of the fuel tank.

One embodiment of the present disclosure is directed to the chassis assembly, wherein the sidewall is a first sidewall, and wherein the at least one crossmember further comprises a second sidewall. The top plate, the first sidewall, and the second sidewall define a channel. The opening is configured to allow the fluid to flow therethrough to reduce air pocket formation within the channel.

One embodiment of the present disclosure is directed to the chassis assembly, wherein the top surface comprises the top plate and a panel coupled to the top plate.

One embodiment of the present disclosure is directed to a method of assembling a chassis assembly for a generator set. The chassis assembly comprises at least one crossmember. The method includes positioning at least a portion of the at least one crossmember in a fuel tank. The at least one crossmember includes a top plate forming a portion of a top surface of the fuel tank. The at least one crossmember includes a sidewall that extends from the top plate to define at least a portion of a channel. The sidewall defines an opening for fluid to flow through. The at least one cross-member includes a pocket extending from the top plate into the channel. The method includes inserting the sidewall in the fuel tank. The method includes coupling the crossmember with a first side rail and a second side rail. The fuel tank is disposed between the first side rail and the second side rail.

One embodiment of the present disclosure is directed to the method wherein the top surface includes a panel. The method further includes sealably coupling the panel with the top plate of the at least one crossmember, disposing the panel and the top plate between the first side rail and the second side rail, and coupling the panel and the top plate with the first side rail and the second side rail.

One embodiment of the present disclosure is directed to the method that further includes coupling the pocket to the top plate. The pocket is configured to receive a projection of an external component.

One embodiment of the present disclosure is directed to the method that further includes coupling the external component with the at least one crossmember via the pocket.

One embodiment of the present disclosure is directed to the method wherein the pocket is provided with a coupling mechanism configured to interface with the projection of the external component, and the external component is an antivibration mount.

One embodiment of the present disclosure is directed to the method further includes positioning the opening in the sidewall adjacent to the top plate of the at least one cross-member.

One embodiment of the present disclosure is directed to the method wherein the top surface comprises a panel, and the at least one crossmember includes a first crossmember and a second crossmember. The method further includes disposing the first crossmember partially in the fuel tank such that the top plate is level with the panel. The method further includes disposing the second crossmember external to the fuel tank. The method further includes coupling the top plate with the panel to create the top surface.

One embodiment of the present disclosure is directed to a fuel tank for a generator set. The fuel tank includes a top surface. The top surface includes a panel and a top plate of a crossmember coupled with the panel. The crossmember includes the top plate. The crossmember includes a first sidewall extending from a first edge of the top plate. The crossmember includes a second sidewall extending from a second edge of the top plate. The first sidewall and the second sidewall extend from the top plate in the same direction. The first sidewall has a first opening and the second sidewall has a second opening. The first sidewall, the first opening, the second sidewall, and the second opening are disposed in the fuel tank.

One embodiment of the present disclosure is directed to the fuel tank wherein the top surface includes a plurality of panels, including the panel. The top surface includes a plurality of top plates of a plurality of crossmembers, including the top plate of the crossmember. At least one of the plurality of panels is disposed between each of the plurality of top plates. The plurality of panels are sealably coupled with the plurality of top plates to create the top surface of the fuel tank.

These and other features, together with the organization and manner of operation thereof, will become apparent from the following detailed description when taken in conjunction with the accompanying drawings. This summary is illustrative only and should not be regarded as limiting.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
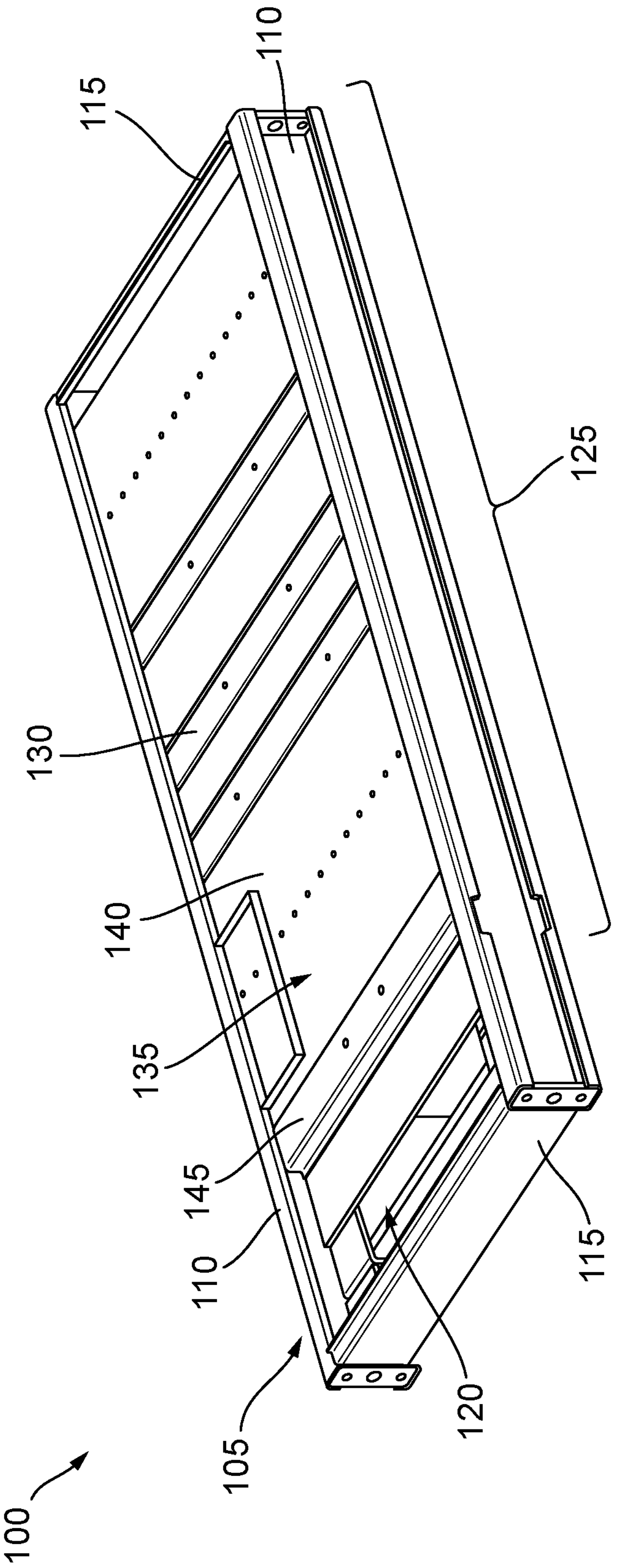
FIG. 1 is a perspective view of a chassis assembly, according to an example embodiment.

Reference is made to the accompanying drawings throughout the following detailed description. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Following below are more detailed descriptions of various concepts related to, and implementations of systems and methods of a hybrid electric powertrain without the use of expensive and hard to find equipment. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to various example embodiments, the systems and methods disclosed herein relate to chassis assembly. The chassis assembly can be configured to support a generator set ("genset") and house or define a fuel tank configured to store fuel used to power the genset. The chassis assembly includes a pair of side rails with a fuel tank disposed therebetween. The chassis assembly includes at least one crossmember that extends between the side rails to provide additional support for the genset. The at least one cross-member is disposed at least partially in the fuel tank. Thus, the crossmember can contribute no additional height to the chassis assembly. The lack of additional height can maintain a lower center of gravity of the genset, and allow the fuel tank to occupy more space between the side rails. Accordingly, the storage capacity of the fuel tank can be increased without increasing the footprint of the chassis assembly.

The at least one crossmember includes a top plate that forms a part of or is coupled with the top surface of the fuel tank. For example, the at least one crossmember can be either fully submerged in the fuel tank such that the top plate interfaces with an inner surface of the top surface of the fuel tank. Alternatively, the at least one crossmember can be partially submerged such that the top plate forms a part of the top surface and sidewalls of the crossmember are disposed in the fuel tank. With the top plate forming a part of the top surface, the top surface can include the top plates and other panels sealably coupled together (e.g., welded) to reduce leakage of fuel. In particular, fuel can be prevented from exiting the fuel tank via the top surface.

The sidewalls of the crossmember can include at least one opening to allow fluid to flow therethrough. For example, the top plate and the sidewalls of the crossmember can form a channel in the fuel tank. As fuel fills the fuel tank, an air pocket may form in the channel. The openings allow the air in the channel to escape the channel to allow the fuel to fill the channels. The openings may be disposed proximate to the top plate of the crossmember to minimize the amount of air to be trapped in the channel and maximize the storage space for the fuel. Hence, air pocket formation can be reduced.

The top plate of the at least one crossmember can include at least one pocket. The pocket may be configured to couple an external component (e.g., an anti-vibration mount) with the at least one cross-member. The pocket can be sealably coupled (e.g., welded) with the top plate to prevent fuel from exiting the fuel tank via the interface between the top plate and the pocket. The pocket can extend into the channel of the crossmember and into the fuel tank.

Figure 2:
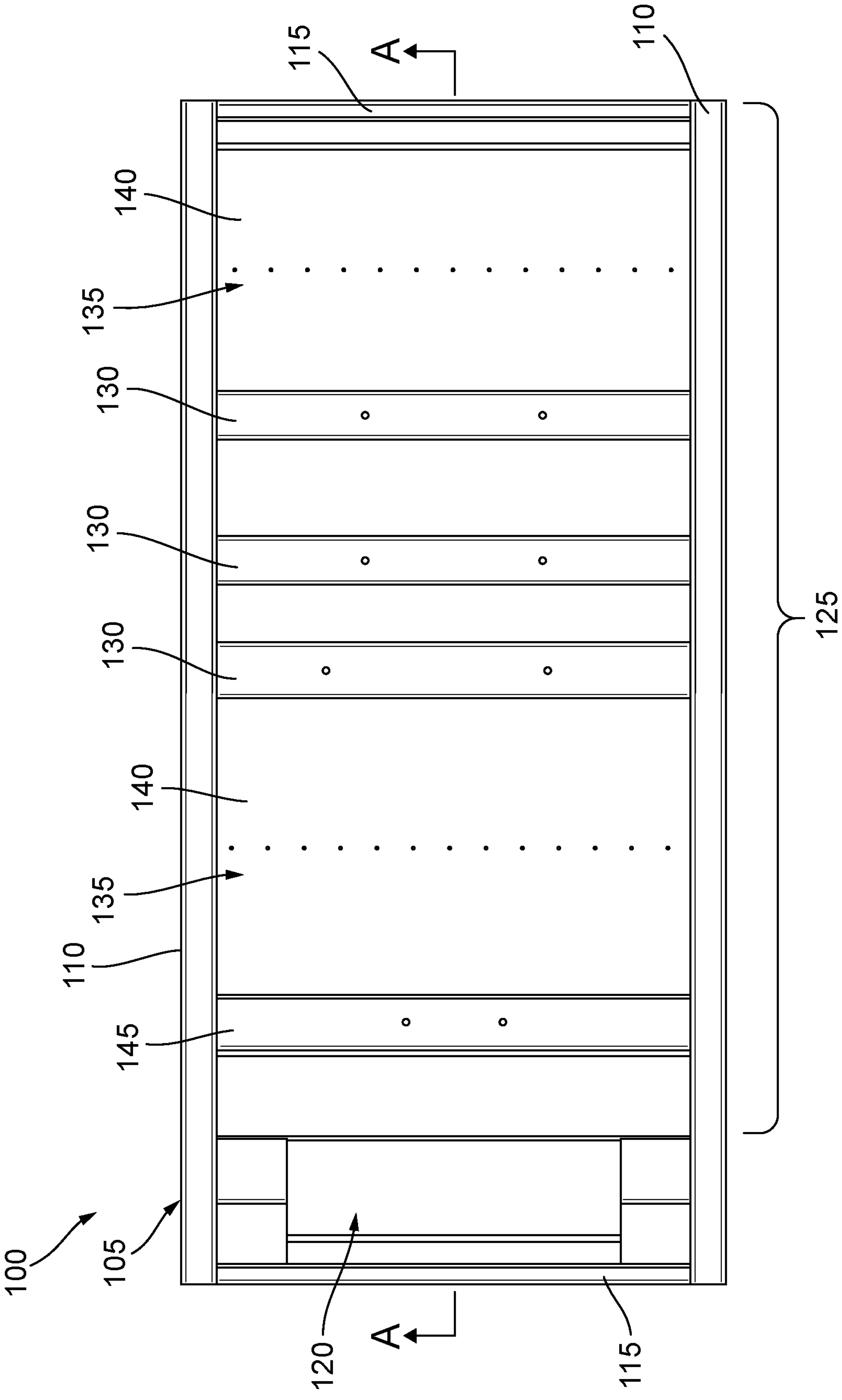
FIG. 2 is a top view of the chassis assembly of FIG. 1.

Referring to FIGS. 1 and 2, a perspective view and a top view of a chassis assembly 100 for a generator set ("genset") are shown, according to an example embodiment. The chassis assembly 100 is a structural support system configured to support a genset. For example, a genset can be disposed on the chassis assembly 100. The chassis assembly 100 includes a frame 105. The frame 105 includes at least one side member, shown as side rail 110. The side rail 110 can extend a length of the chassis assembly 100. The frame 105 can include at least one end member 115. The end member 115 can extend a width of the chassis assembly 100.

The frame 105 can include a first side rail 110 and a second side rail 110. The end member 115 can extend between the first side rail 110 and the second side rail 110. For example, the first side rail 110 can be positioned away from the second side rail 110. For example, the first side rail 110 can be parallel to and spaced apart from the second side rail 110. A first end of the end member 115 can couple with the first side rail 110 and a second end of the end member 115 can couple with the second side rail 110. The end member 115 can couple with a side rail 110 at an end of the side rail 110. The frame 105 can include a plurality of end members 115. For example, the frame 105 can include a first or front end member 115 and a second or rear end member 115. The front and rear end members 115 can extend between the first and second side rails 110. The front end member 115 can couple with a front end of the side rails 110 and the rear end member 11 can couple with a rear end of the side rails 110.

The frame 105 can define a cavity 120. For example, two end members 115 coupled with and disposed between two side rails 110 can define the cavity 120. As described in more detail herein, at least a portion of the cavity 120 can be used as a fuel tank 125. The fuel tank 125 is disposed between the first side rail 110 and the second side rail 110. The fuel tank 125 can store fuel to power the genset that is supported by the chassis assembly 100. The fuel tank 125 can extend along at least a portion of the frame 105. The side rails 110 can be the sides of the fuel tank 125.

The chassis assembly 100 includes at least one structural support member, shown as crossmember 130. The crossmember 130 can be configured to provide additional support for the genset. For example, the crossmember 130 can spread the load from the genset to the side rails 110. The crossmember 130 is disposed at least partially in the fuel tank 125 of the chassis assembly 100. The crossmember 130 can extend between and couple with the side rails 110. For example, a first end of the crossmember 130 can couple with a first side rail 110 and a second end of the crossmember 130 can couple with a second side rail 110. In some embodiments, the ends of the crossmember 130 are welded to the side rails 110. The chassis assembly 100 can include a plurality of crossmembers 130. For example, the chassis assembly 100 can include two, three, four, or more crossmembers 130. In some embodiments, different crossmembers 130 can support different components of a genset. For example, a first crossmember 130 can be configured to support a first component (e.g., an engine) of the genset and a second crossmember 130 can be configured to support a second component (e.g., a generator or alternator) of the genset.

The chassis assembly 100 includes a top surface 135. The top surface 135 can be configured to support the genset. For example, the genset can be disposed on the top surface 135 of the chassis assembly 100. The top surface 135 can be the top of the fuel tank 125. The top surface 135 can extend between the first side rail 110 and the second side rail 110. The top surface 135 can include at least one panel 140. The panel 140 can be a flat and thin piece of material (e.g., sheet metal) to create at least a portion of the top surface 135. The top surface 135 can include a plurality of panels 140. The panels 140 can be coupled together to form the top surface 135. For example, the panels 140 can be welded together.

In some embodiments, the top surface 135 can also include a portion of a crossmember 130. For example, as described in more detail herein, a top portion of the crossmember 130 can form a portion of the top surface 135. In such embodiment, a panel 140 can couple with the top portion of the crossmember 130 to form the top surface 135. For example, a panel 140 can be welded to the crossmember 130. In some embodiments, the top surface 135 can include a plurality of panels 140 and portions of a plurality of crossmembers 130. At least one panel 140 can be disposed between each crossmember 130. The panels 140 and the crossmember 130 can be sealably coupled together (e.g., welded together) to form the top surface 135.

The chassis assembly 100 may include at least one other structural support member, shown as external crossmember 145. The external crossmember 145 can be disposed outside of the fuel tank 125. The external crossmember 145 can be the same as the crossmember 130 or can be different. For example, the size, the shape, the number and type of openings, or other features of the external crossmember 145 can be the same or different than the crossmember 130.

Figure 3:
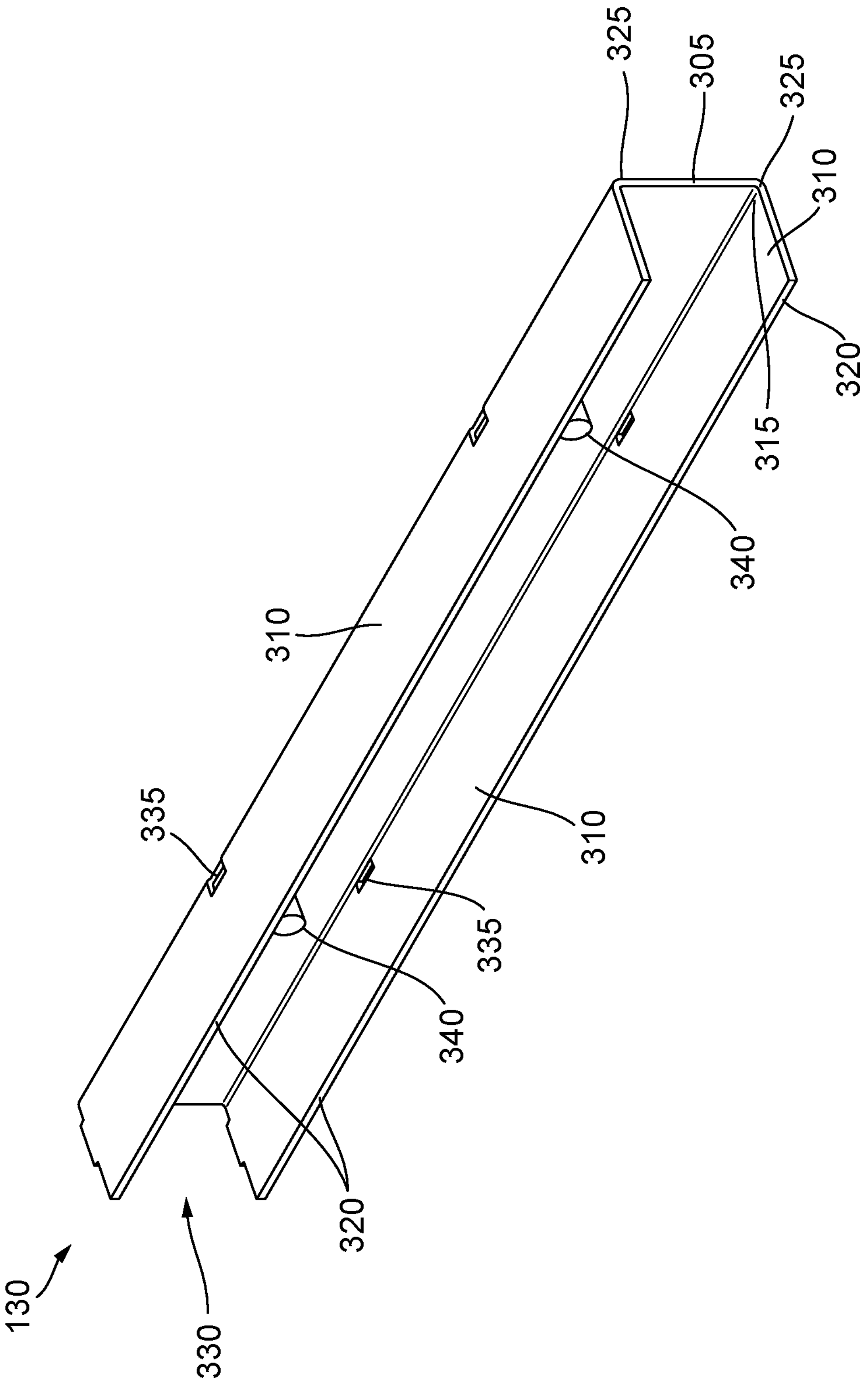
FIG. 3 is a bottom perspective view of a crossmember of the chassis assembly of FIG. 1.
Figure 4:
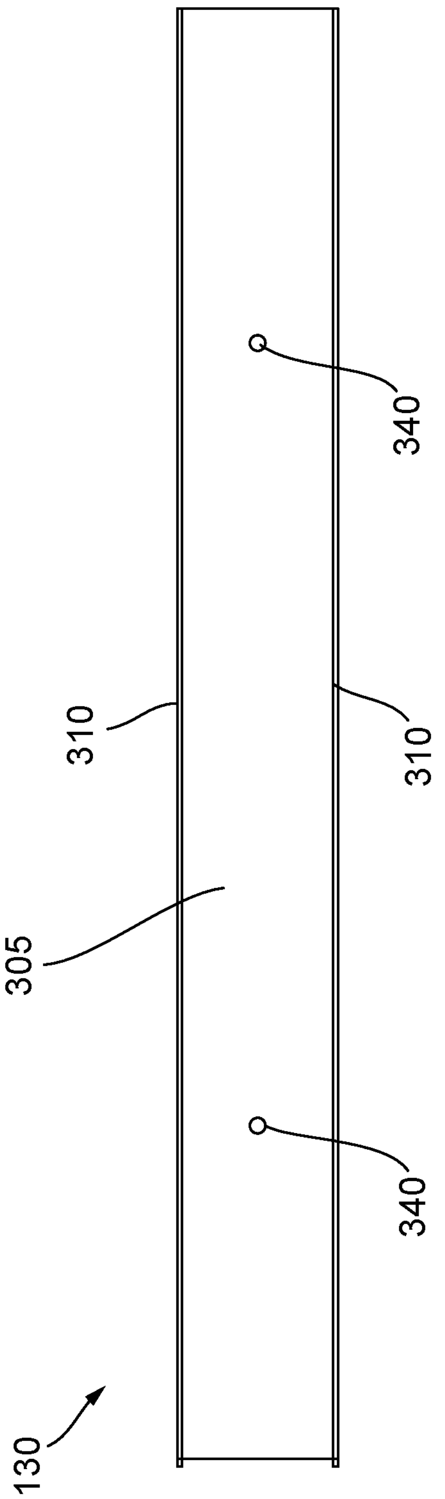
FIG. 4 is a top view of the crossmember of FIG. 3.

Referring to FIGS. 3 and 4, a bottom perspective view and a top view of a crossmember 130 are shown, according to an example embodiment. The crossmember 130 has a top portion, shown as top plate 305. The crossmember 130 has at least one sidewall 310 extending from the top plate 305. In some embodiments, the crossmember 130 can be curved. For example, the crossmember 130 can have a C-shape. For example, the crossmember 130 can have a first sidewall 310 extending from a first edge of the top plate 305 and a second sidewall 310 extending from a second edge of the top plate 305. The sidewalls 310 can be coupled with or integral (e.g., monolithic) with the top plate 305. For example, the sidewalls 310 and the top plate 305 can be formed from a single component, with the sidewalls 310 being bent to extend in the same direction from the top plate 305 to form the C-shape.

The sidewalls 310 can have a first edge, shown as top edge 315, and a second edge, shown as bottom edge 320. The top edge 315 can be the edge of the sidewall 310 that couples with or is integral with (e.g., transitions into) the top plate 305. The bottom edge 320 can be the edge of the sidewall 310 opposite the top edge 315 and spaced apart from the top plate 305. The crossmember 130 can include a transition portion 325. The transition portion 325 can be disposed between the top plate 305 and the sidewall 310. For example, the transition portion 325 can be a bent portion that transitions the top plate 305 into the sidewall 310. The transition portion 325 can be a joint or coupling mechanism that couples the sidewall 310 with the top plate 305.

In some embodiments, all the crossmembers 130 can have the same configuration (e.g. a C-shape). In some embodiments, crossmembers 130 can have different configurations or shapes. For example, a first crossmember 130 can have a first shape and a second crossmember 130 can have a second shape. For example, a first crossmember 130 can have a C-shape. A second crossmember 130 can have a top hat shape (e.g., a flange extends from a free edge of both sidewalls 310 away from each other). The shape of the crossmember 130 can be based on the amount of load the crossmember 130 is to support. For example, a crossmember 130 with a first shape can be configured to support a greater load than a crossmember 130 with a second shape.

The crossmember 130 can define a channel 330. The channel 330 can be defined by the top plate 305, a first sidewall 310, and a second sidewall 310. The channel 330 can extend a length of the crossmember 130.

The crossmember 130 includes at least one opening 335. The opening 335 can extend through the crossmember 130 to fluidly couple the channel 330 with the environment external to the crossmember 130. The opening 335 can be a vent for fluid (e.g., air) to exit the channel 330. For example, the opening 335 can be configured for fluid to flow through. The opening 335 can be any shape or size. For example, the opening 335 can be a circle or square or can have an elongated shape, among others. The sidewall 310 of the crossmember 130 defines at least one opening 335. The opening 335 can extend through the sidewall 310. The opening 335 can be positioned closer to the top edge 315 of the sidewall 310 than the bottom edge 320. In some embodiments, the opening 335 is positioned as close to the top plate 305 as possible. For example, the opening 335 can be positioned at the top edge 315 of the sidewall 310. The opening 335 can be positioned in the transition portion 325 of the crossmember 130.

The crossmember 130 can include a plurality of openings 335. For example, a plurality of openings 335 can be disposed along the length of the crossmember 130. A plurality of openings 335 can be disposed along a sidewall 310 of the crossmember 130. A first opening or a first plurality of openings 335 can be disposed on a first sidewall 310 and a second opening 335 or a second plurality of openings 335 can be disposed on a second sidewall 310. The openings 335 can be disposed adjacent to the top plate 305 of the crossmember 130.

The crossmember 130 can include at least one pocket 340. The pocket 340 can be configured to receive a projection of an external component. For example, the pocket 340 can be a projection that extends from the top plate 305 of the crossmember 130 into the channel 330. The pocket 340 can be configured to receive the projection from the external component. For example, the pocket 340 can define a cavity configure to receive the projection. A depth of the pocket 340 can be based on a length of the projection to be disposed in the pocket 340. The pocket 340 can be a closed pocket 340. For example, the cavity defined by the pocket 340 can not be exposed to the channel 330 to prevent any fluid or material from within the channel from entering the pocket 340. The pocket 340 can be coupled with the top plate 305 of the crossmember 130. For example, the pocket 340 can be welded or bonded with the top plate 305, or otherwise secured to the top plate 305. The pocket 340 can be coupled with the top plate 305 such that no fluid or material from within the channel 330 can exit the channel 330 via the interface between the pocket 340 and the top plate 305.

The crossmember 130 can have a plurality of pockets 340. The number of pockets 340 can be based on the number of external components to be coupled with or disposed on the crossmember 130. The pockets 340 can be disposed along the top plate 305 of the crossmember 130.

Figure 5:
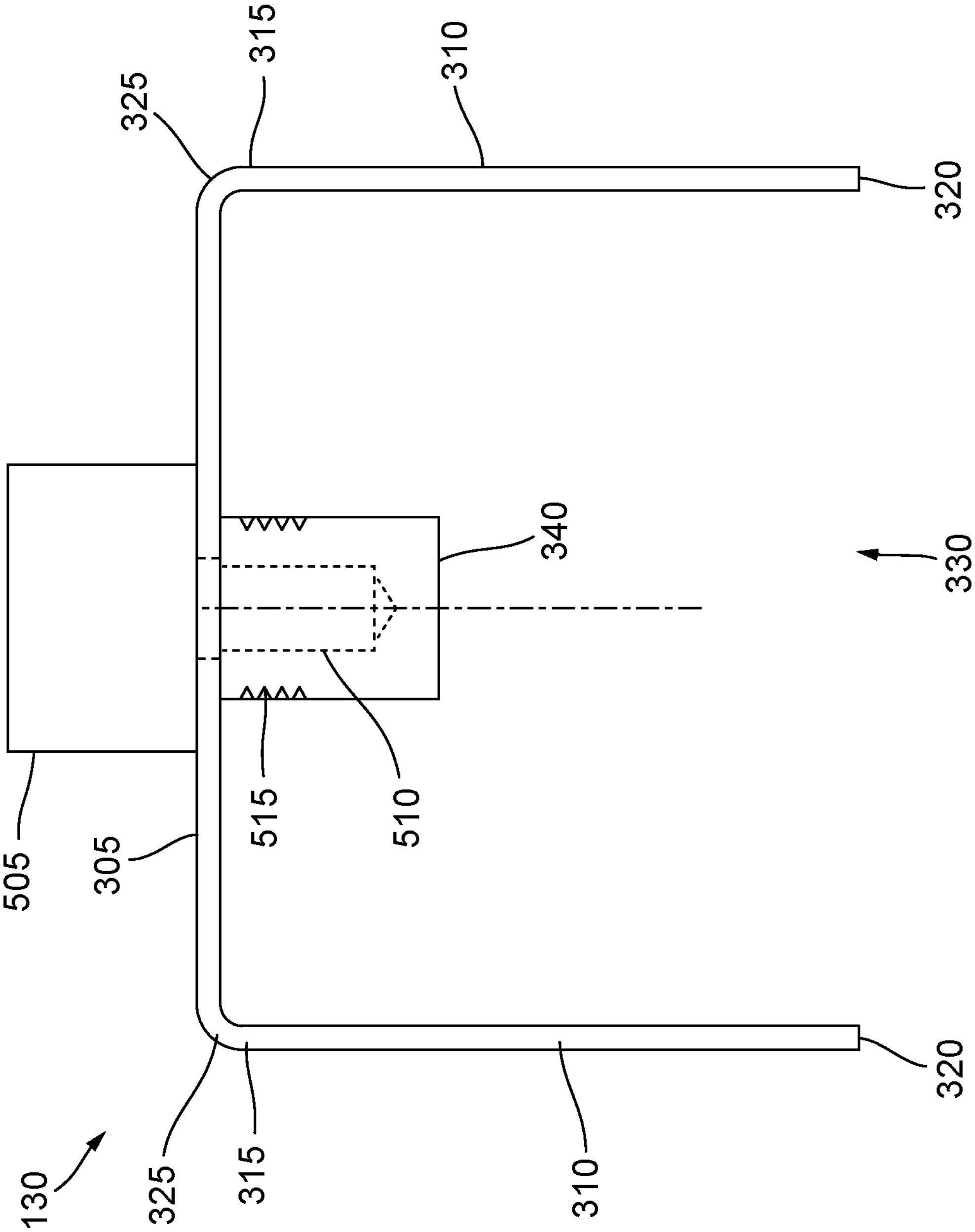
FIG. 5 is a front view of the crossmember of FIG. 3.

Referring now to FIG. 5, a front view of the crossmember 130 is shown, according to an example embodiment. The pocket 340 can extend into the channel 330 of the crossmember 130. The pocket 340 can extend perpendicular to the top plate 305. In some embodiments, the chassis assembly 100 can include an external component 505. The external component 505 can be, for example, an anti-vibration mount. The external component 505 can include at least one projection 510 configured to be disposed in the pocket 340. The pocket 340 can be configured to receive a projection 510 of the external component 505. The size and shape of the pocket 340 can be based on the size and shape of the projection 510 to be received. The pocket 340 can be configured to couple the external component 505 with the crossmember 130. For example, the pocket 340 can include a coupling mechanism 515. The coupling mechanism 515 can be configured to interface with the projection 510 of the external component 505. In some embodiments, the coupling mechanism 515 can be threads configured to interface with corresponding threads of the projection 510. The coupling mechanism 515 can be any type of mechanism configured to interface with the projection 510 of the external component 505 and couple the external component 505 with the crossmember 130.

Figure 6:
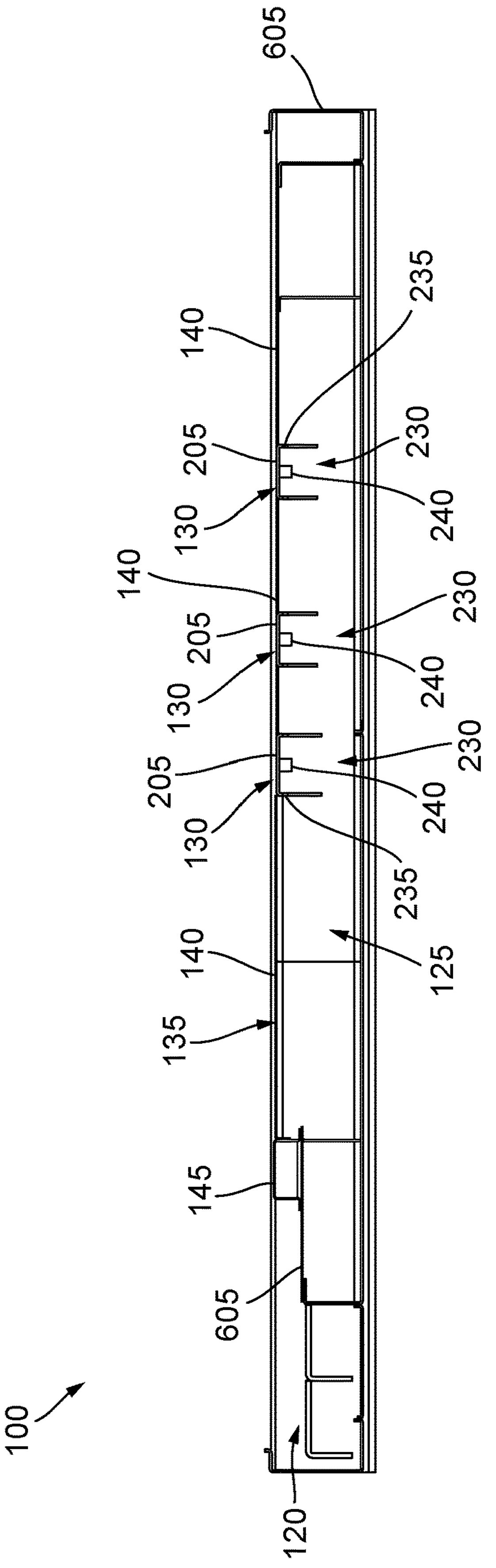
FIG. 6 is a cross-sectional view of a portion of the chassis assembly of FIG. 1, as seen along line A-A of FIG. 2.

Referring to FIG. 6, a cross-sectional view of a portion of the chassis assembly 100 is shown, as seen along Section A in FIG. 1, according to an example embodiment. A fuel tank 125 can be formed within the cavity 120 of the chassis assembly 100. For example, the fuel tank 125 has a top surface 135. The top surface 135 of the fuel tank 125 is the top surface 135 of the chassis assembly 100. The side rails 110 of the chassis assembly 100 can be the sides of the fuel tank 125. The chassis assembly 100 can have additional structural members or tank walls 605 that define the shape of the fuel tank 125 within the cavity 120.

The chassis assembly 100 includes at least one crossmember 130 disposed at least partially in the fuel tank 125. Disposing the crossmember 130 in the fuel tank 125 can increase the capacity of the fuel tank 125, while reducing the overall height. Therefore, the center of gravity of the genset disposed on the chassis assembly 100 can be lowered relative to the center of gravity if the crossmember 130 were elevated. For example, the sidewalls 310 of the crossmember 130 can be disposed in the fuel tank 125. The top plate 305 of the crossmember 130 is disposed level with or below the top surface 135. For example, in some embodiments, the top plate 305 of the crossmember 130 can form a part of the top surface 135 of the fuel tank 125. For example, a panel 140 of the top surface 135 can sealably couple with the top plate 305 of the crossmember 130 to create the top surface 135. In some embodiments, the top surface 135 can comprise only panels 140 with the top plate 305 disposed below the top surface 135 in the fuel tank 125. The top plate 305 can still be coupled with a panel 140, but an inner surface of the panel 140.

According to an example embodiment, the fuel tank 125 includes a top surface 135. The top surface 135 includes a panel 140 and a top plate 305 of a crossmember 130. The top plate 305 is coupled with the panel 140. The crossmember 130 includes the top plate 305. The crossmember 130 includes a first sidewall 310 extending from a first edge of the top plate 305 and a second sidewall 310 extending from a second edge of the top plate 305. The first sidewall 310 and the second sidewall 310 extend in the same direction from the top plate 305. The first sidewall 310 has a first opening 335 and the second sidewall 310 has a second opening 335. The first sidewall 310, the first opening 335, the second sidewall 310, and the second opening 335 are disposed in the fuel tank 125.

In some embodiments, the top surface 135 comprises a plurality of panels 140 and a plurality of top plates 305 of a plurality of crossmembers 130. At least one of the plurality of panels 140 can be disposed between each of the plurality of top plates 305. The plurality of panels 140 can be sealably coupled with the plurality of top plates 305 to create the top surface 135 of the fuel tank 125.

The chassis assembly 100 can may include a plurality of crossmembers 130 comprising a plurality of top plates 305. The top surface 135 of the fuel tank 125 can include a plurality of panels 140 coupled with the plurality of top plates 305. The panels 140 can be sealably coupled with the top plates 305 to prevent fuel from leaking out of the fuel tank 125 via the top surface 135.

The sidewalls 310 are disposed in the fuel tank 125 such that the crossmember 130 can define a channel 330 within the fuel tank 125. The openings 335 of the crossmember 130 can be disposed on the sidewalls 310 of the crossmember 130 such that the openings 335 are disposed in the fuel tank 125. The openings 335 can be disposed as close to the top plate 305 or the top surface 135 as possible. For example, as fuel fills the fuel tank 125, fuel can begin to fill the channel 330 of the crossmembers 130. The openings 335 can provide a path for air to exit from the channel 330 as fuel fills the channel 330. The openings 335 can allow the fluid to flow therethrough to reduce or prevent air pocket formation within the channel 330. Further, the openings 335 can allow fuel to fill the channel 330 to create additional available space for fuel, thus increasing the fuel capacity of the fuel tank 125.

The pocket 340 of the crossmember 130 can be disposed in the fuel tank 125. The pocket can be configured to reduce leakage of fuel from the fuel tank 125. For example, the pocket 340 can be a closed pocket 340 to prevent leakage from the fuel tank 125 via the interface between the pocket 340 and the top plate 305 of the crossmember 130. In some embodiments, the pocket 340 can be welded to the top plate 305 to reduce leakage of fuel from the fuel tank 125. In particular, the pocket 340 can be welded to the top plate.

The chassis assembly 100 may include a plurality of crossmembers 130. The plurality of crossmembers 130 can be disposed at least partially in the fuel tank 125. For example, as shown in FIG. 4, a first crossmember 130 can be disposed at a first position in the fuel tank 125 and a second crossmember 130 can be disposed at a second position in the fuel tank 125. The top plate 305 of the first crossmember 130 and a top plate 305 of the second crossmember 130 can be portions of the top surface 135 of the fuel tank 125. Any number of crossmembers 130 can be disposed at least partially inside the fuel tank 125.

In some embodiments, the chassis assembly 100 may include at least one external crossmember 145. In some embodiments, the external crossmember 145 disposed external to the fuel tank 125 can be different than the crossmembers 130 disposed in the fuel tank 125. For example, the crossmembers 130 may have a C-shape, have at least one pocket 340, and have at least one opening 335. The external crossmember 145 may have a top hat shape, and may not have a pocket 340 or an opening 335, or may only have one of a pocket 340 or an opening 335. In some embodiments, the external crossmember 145 can be the same as the crossmember 130.

Figure 7:
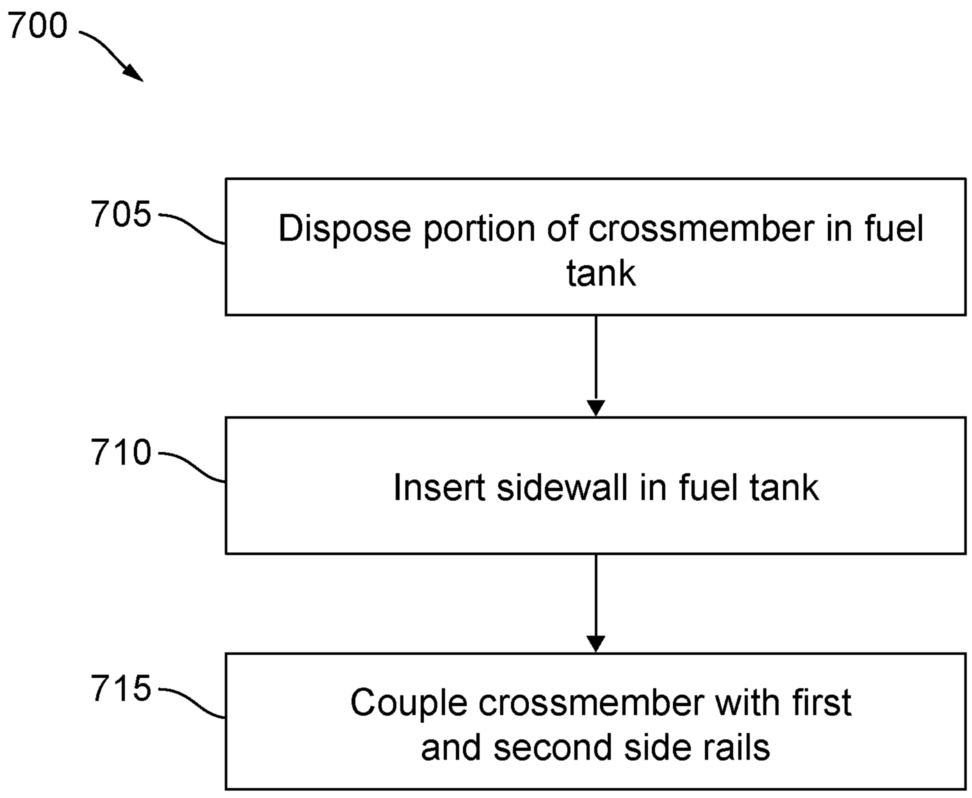
FIG. 7 is a flow diagram of a method of assembling a chassis assembly, according to an example embodiment.

Referring to FIG. 7, a method 700 of assembling a chassis assembly 100 for a generator set is shown, according to an example embodiment, wherein the chassis assembly 100 includes at least one crossmember 130. Method 700 includes positioning at least a portion of the at least one crossmember 130 in a fuel tank 125 (step 705). The fuel tank 125 has a top surface 135. The crossmember 130 includes at top plate 305 disposed level with or below the top surface 135 of the fuel tank 125. The crossmember includes a sidewall 310 that extends from the top plate 305. The sidewall 310 includes at least one opening 335 for fluid to flow through.

In some embodiments, step 705 can include sealably coupling a panel 140 of the top surface 135 of the fuel tank 125 with the top plate 305 of the crossmember 130. The panel 140 and the top plate 305 can be disposed between a first side rail 110 and a second side rail 110.

In some embodiments, method 700 can include coupling a pocket 340 to the top plate 305 of the crossmember 130. For example, the pocket 340 can be welded or bonded to the top plate 305, or otherwise secured to the top plate 305. The pocket 340 can extend into a channel 330 defined by the crossmember 130 from the top plate 305. The pocket 340 can be configured to receive a projection 510 of an external component 505 to couple the external component 505 with the crossmember 130. For example, method 700 can include coupling the external component 505 with the crossmember 130 via the pocket 340. The pocket 340 can be provided with a coupling mechanism 515 configured to interface with the projection 510 of the external component 505. In some embodiments, the external component 505 can be an anti-vibration mount.

In some embodiments, method 700 includes positioning an opening 335 of a sidewall 310 of the crossmember 130 adjacent to the top plate 305 of the crossmember 130.

Method 700 includes inserting the sidewall 310 of the at least one crossmember 130 in the fuel tank 125 (step 710). In some embodiments, the crossmember 130 can include a plurality of sidewalls 310. Each of the sidewalls 130 can be disposed in the fuel tank 125.

Method 700 includes coupling the at least one crossmember 130 with a first side rail 110 and a second side rail 110 (step 715). In some embodiments, step 715 can include coupling the crossmember 130 with the first side rail 110 and the second side rail 110. For example, the crossmember 130 can be welded, bonded, or otherwise secured to the first side rail 110 and the second side rail 110. In some embodiments, the panel 140 and the top plate 305 can be coupled with the first side rail 110 and the second side rail 110.

In some embodiments, method 700 can include providing a plurality of crossmembers 130, including a first crossmember 130 and a second crossmember. The first crossmember 130 can be disposed at least partially in the fuel tank 125 such that a top plate 305 of the first crossmember 130 is level with a panel 140 of the top surface 135 of the fuel tank 125. The top plate 305 can be coupled with the panel 140 to create the top surface 135 of the fuel tank 125. The second crossmember 130 can be disposed external to the fuel tank 125.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the flexible hybrid system 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A chassis assembly for a generator set, comprising:
- a frame comprising a first side rail and a second side rail;
- a fuel tank disposed between the first side rail and the second side rail, the fuel tank comprising a top surface; and
- at least one crossmember disposed at least partially in the fuel tank, the at least one crossmember comprising:
  - a top plate disposed level with or below the top surface of the fuel tank; and
  - a sidewall that extends from the top plate, the sidewall disposed in the fuel tank and defining an opening for fluid to flow through.

2. The chassis assembly of claim 1, wherein the first side rail is positioned away from the second side rail, and the at least one crossmember extends between the first side rail and the second side rail and couples with the first side rail and the second side rail.

3. The chassis assembly of claim 1, wherein the sidewall comprises a top edge and a bottom edge, the top edge coupled with or integral with the top plate and the bottom edge spaced apart from the top plate, the opening positioned closer to the top edge than the bottom edge.

4. The chassis assembly of claim 1, wherein the at least one crossmember defines a channel within the fuel tank, the opening being a vent for air to exit the channel.

5. The chassis assembly of claim 1, wherein the at least one crossmember comprises a plurality of openings, the plurality of openings disposed along a length of the at least one crossmember and adjacent to the top plate of the at least one crossmember.

6. The chassis assembly of claim 1, wherein the at least one crossmember comprises a pocket that extends from the top plate of the crossmember into the channel, the pocket configured to receive a projection of an external component, the pocket being configured to reduce leakage of fuel from the fuel tank.

7. The chassis assembly of claim 6, further comprising an antivibration mount, the antivibration mount comprising the projection to be disposed in the pocket of the at least one crossmember.

8. The chassis assembly of claim 1, wherein the at least one crossmember comprises a plurality of crossmembers disposed at least partially in the fuel tank, the plurality of crossmembers comprising a first crossmember and a second crossmember, the first crossmember being configured to support an engine and the second crossmember configured to support an alternator.

9. The chassis assembly of claim 8, wherein:
- the plurality of crossmembers comprise a plurality of top plates; and
- the top surface comprises a plurality of panels, the plurality of panels sealably coupled with the plurality of top plates to reduce leakage of fuel from the fuel tank via the top surface.

10. The chassis assembly of claim 1, wherein the at least one crossmember comprises a plurality of crossmembers, the plurality of crossmembers comprising a first crossmember and a second crossmember, the first crossmember disposed at least partially in the fuel tank and the second crossmember disposed external to the fuel tank, wherein the top plate of the first crossmember is a portion of the top surface of the fuel tank.

11. The chassis assembly of claim 1, wherein the sidewall is a first sidewall, wherein the at least one crossmember further comprises a second sidewall, wherein the top plate, the first sidewall, and the second sidewall define a channel, and the opening is configured to allow the fluid to flow therethrough to reduce air pocket formation within the channel.

12. The chassis assembly of claim 1, wherein the top surface comprises the top plate and a panel coupled to the top plate.

13. A method of assembling a chassis assembly for a generator set, wherein the chassis assembly comprises at least one crossmember, the method comprising:
- positioning at least a portion of the at least one crossmember in a fuel tank, the at least one crossmember comprising:
  - a top plate forming a portion of a top surface of the fuel tank;
  - a sidewall that extends from the top plate to define at least a portion of a channel, the sidewall defining an opening for fluid to flow through; and
  - a pocket extending from the top plate into the channel; and
- inserting the sidewall in the fuel tank; and
- coupling the at least one crossmember with a first side rail and a second side rail, the fuel tank disposed between the first side rail and the second side rail.

14. The method of claim 13, wherein the top surface comprises a panel, the method further comprising:

sealably coupling the panel with the top plate of the at least one crossmember;

disposing the panel and the top plate between the first side rail and the second side rail; and coupling the panel and the top plate with the first side rail and the second side rail.

15. The method of claim 13, further comprising:

coupling the pocket to the top plate, the pocket configured to receive a projection of an external component.

16. The method of claim 15, further comprising:

coupling the external component with the at least one crossmember via the pocket.

17. The method of claim 15, wherein:

the pocket is provided with a coupling mechanism configured to interface with the projection of the external component, and the external component is an antivibration mount.

18. The method of claim 13, wherein the top surface comprises a panel, and the at least one crossmember includes a first crossmember and a second crossmember, the method further comprising:

disposing the first crossmember partially in the fuel tank such that the top plate is level with the panel;

disposing the second crossmember external to the fuel tank; and coupling the top plate with the panel to create the top surface.

19. A fuel tank for a generator set, the fuel tank comprising:

a top surface, comprising:

a panel; and a top plate of a crossmember coupled with the panel, wherein the crossmember comprises:

the top plate;

a first sidewall extending from a first edge of the top plate; and a second sidewall extending from a second edge of the top plate, the first sidewall and the second sidewall extending from the top plate in the same direction;

wherein the first sidewall has a first opening and the second sidewall has a second opening; and wherein the first sidewall, the first opening, the second sidewall, and the second opening are disposed in the fuel tank.

20. The fuel tank of claim 19, wherein the top surface comprises:

a plurality of panels, including the panel; and a plurality of top plates of a plurality of crossmembers, including the top plate of the crossmember, wherein at least one of the plurality of panels is disposed between each of the plurality of top plates; and wherein the plurality of panels are sealably coupled with the plurality of top plates to create the top surface of the fuel tank.

* * * * *